United States Patent [19]

Acciai et al.

[11] Patent Number: 4,502,063
[45] Date of Patent: Feb. 26, 1985

[54] ELECTRODE CONFIGURATION FOR THE PRINT HEAD OF AN ELECTROLYTIC PRINTER

[75] Inventors: Michael Acciai, Newark Valley; Charles R. Pigos, Endicott, both of N.Y.; Charles G. Speicher, Brackney, Pa.

[73] Assignee: International Business Machines Corporation, Armonk, N.Y.

[21] Appl. No.: 481,511

[22] Filed: Apr. 1, 1983

[51] Int. Cl.³ .................................................. G01D 15/06
[52] U.S. Cl. ...................................... 346/155; 346/165
[58] Field of Search .................... 346/139 C, 155, 165

[56] References Cited

U.S. PATENT DOCUMENTS

| | | | |
|---|---|---|---|
| 2,830,867 | 4/1958 | Kohn et al. | 346/165 |
| 3,470,563 | 9/1969 | Starr, Jr. | 346/155 |
| 3,898,674 | 8/1975 | Koch | 346/155 |

Primary Examiner—Thomas H. Tarcza
Attorney, Agent, or Firm—Saul A. Seinberg

[57] ABSTRACT

A print head for use in an electrolytic matrix printer is described. In this print head, predetermined ones of a plurality of electrodes are permanently grounded and are thereby forced to always function as cathodes. The remaining electrodes serve as print electrodes and, depending on the information needed during a given print cycle, either print or are not energized. These print electrodes, therefore, are constrained to always function as anodes. Fixing the function of the electrodes in the print cycle prevents reverse current flow in an electrode from print cycle to print cycle and placing the permanently grounded electrodes intersticially between and about the print electrodes to isolate them, in particular, further enhances this effect. This is particularly beneficial when using platinum print electrodes that form a protective passivation layer which is destroyed by the reverse current flow resulting from alternating electrode functions.

4 Claims, 3 Drawing Figures

ELECTRODE CONFIGURATION FOR THE PRINT HEAD OF AN ELECTROLYTIC PRINTER

BACKGROUND OF THE INVENTION

1. Field of the Invention

This invention is concerned with the arrangement of electrodes within the print head of a non-impact printer. More particularly, this invention is directed to improve print head apparatus having improved operating and enhanced wear characteristics.

2. Description of the Prior Art

The concept of electrically generated printing had sparked interest since the 1840's. Most attempts at utilizing an electrically initiated printing reaction required relatively high voltages, in the order of 100 to 250 volts, saturated or partially wetted paper and/or consumable electrodes. It was also necessary to employ a special recording medium which would be suitable for the particular printing system being used. Almost all of the prior art systems relied on either relatively high or long amplitude voltage pulses to achieve "dry" or "wet" printing. As might be expected, there were also hybrid systems and recording medium therefor that attempted to reconcile and/or compensate for the disadvantages of both the dry and wet approaches. However, as is the case with most compromise situations, these efforts were either too expensive to commercially implement or unsatisfactory in performance.

Various efforts were made to improve different aspects of the prior art electrically induced printing systems. Such efforts led to the use of electrolytic based printers wherein a relatively low voltage, on the order of no more than 25 volts, is employed to effect printing. One printing system that functions at low energy printing levels, of a magnitude that is compatible with today's densely populated integrated circuit chips, is described in the commonly assigned U.S. Patent Application Ser. No. 237,560 filed on Feb. 24, 1981 in the name of Bernier et al. In this printing arrangement, a leuco dye resident in or applied to the surface of the recording medium used therein is rendered visible by the application of a low energy pulse, providing that the surface layer thickness of the recording medium, the contact surface area of the print electrodes and the spacing therebetween are all set to predetermined values.

It has been found that the specific configuration of the multiple electrode print head plays an important role in overall performance in printers of this type. Also of importance is the particular material that the electrodes are made of and the manufacturing methods used to produce the print head. Print heads used in such electrolytically implemented printers must be able to withstand considerable electrolytic and electrochemical wear forces, the low print voltages notwithstanding. This aspect of print head life is in addition to the normal mechanical, principally frictional wear that a print head must tolerate. In addition, it has been determined that proper electrode configuration and isolation aids in preventing secondary or latent printing by trailing electrodes.

With respect to this type of printing, it has been determined that there are certain electrode materials that have good to excellent overall wear characteristics, provided that they are utilized properly. Platinum is one example of such an electrode material. It has excellent head wear characteristics under electrochemical and electrolytic stress, but must be correctly employed in order to benefit from its use. Specifically, the superior wear characteristics of platinum are attributable, at least in part and to the extent germane to this invention, to a passivation or barrier layer which is formed on its exposed surfaces. It is this layer that serves in large measure to minimize electrode wear when platinum electrodes are used in an electrolytic printer.

In use, however, it becomes evident that platinum electrodes were wearing unusually fast in print heads where they were not electrically isolated, at a rate that was far in excess of that expected. The actual cause of this problem was found to be electrode reversal in the print head, a situation where an electrode was allowed to function as both an anode or cathode, depending on whether or not it was printing during particular portion of the print cycle. The change in current flow that resulted from this electrode function reversal had the unfortunate result of reducing or even destroying the passivation layer on the platinum electrodes. The solution, and the basis of the present invention, was to permanently force non-reversible roles on the print head electrodes.

One possible response to this problem is disclosed in U.S. Pat. No. 3,898,674 to Koch, although not specifically articulated as such in the reference. The Koch print head incorporates multiple electrodes, each being surrounded by an annular insulating ring which serves to separate the individual electrodes from a common ground. In performing this function, the insulating rings prevent any current flow into a particular electrode and thereby preclude said electrodes from reversing their roles as printing styli or cathodes. Unfortunately, it has been found that it is particularly difficult to build a print head in accordance with the teachings of Koch. For example, the insulating ring that surrounds each electrode must provide a perfect electrical seal and prevent all reverse current flow or the electrode will exhibit excessive wear and premature failure before too long. Print heads having such perfectly formed and uniform insulating rings have been difficult and expensive to manufacture. Thus, while the theoretical solution to this electrode wear problem is know, a practical solution thereto remains to be implemented.

OBJECTS AND SUMMARY OF THE INVENTION

Accordingly, it is a principal object of the present invention to provide means and a method for reducing or eliminating electrolytically or electrochemically induced print electrode wear in a matrix electrolytic printer.

It is also a principal object of the present invention to provide such means and method whereby reduced or significantly limited electrode wear can be achieved with an economically implemented print head.

It is a further object of the present invention to provide means for and a method of limiting electrode wear through print head configuration without adversely affecting print resolution or thruput rates of the printer.

It is another object of the present invention to provide means for and a method of limiting electrode wear through print head configuration that is compatible with the electrolytic printing process and materials being used, particularly when using platinum electrodes.

These and other objects of the present invention are achieved by placing intersticial electrodes between all other electrodes in a print head. The intersticial or added electrodes are permanently connected to and always serve as ground elements. The print electrodes are connected and always utilized as printing elements, as needed. They are placed within the print head to have an overlap of from 30 to 50 percent in the vertical print direction. In this manner, neither the print or interstitial ground electrodes are ever allowed to reverse function at any point in the printer's operation.

BRIEF DESCRIPTION OF THE DRAWINGS

The invention will be described further, by way of preferred examples thereof, with reference to the accompanying drawings wherein like reference numerals have been used in the several views to depict like elements, in which.

DESCRIPTION OF THE PREFERRED EMBODIMENT

Figure 1:
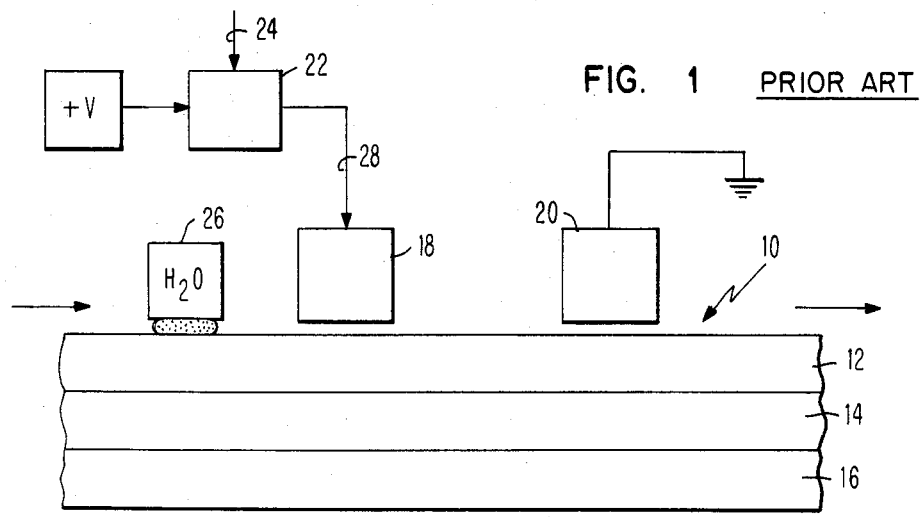
FIG. 1 schematically illustrates a simplified representation of a typical prior art electrolytic printing system.

As has been demonstrated in the prior art, electrolytic printing can be accomplished by controlling the amplitude or the pulse width of a print signal or pulse forwarded to and applied by print electrodes to a suitable recording medium 10. As is more completely described in the aforementioned commonly assigned United States Patent Application Ser. No. 237,560, the recording medium 10 consists of a surface layer 12, a conductive layer 14 and a support layer 16, see FIG. 1. These layers are joined together by known techniques. The recording medium 10 is brought beneath a print electrode (anode) 18 by a suitable transport mechanism, not shown. A ground electrode (cathode) 20 is provided and located a predetermined distance from the print electrode 18. For ease of explanation and illustration, only one each of the print and ground electrodes have been shown in FIG. 1. It will be understood by those having skill in this art that there are a number of each type of electrode. In some print head designs, a ground plane is provided in addition to the ground electrodes. This is more clearly shown in FIGS. 2 and 3.

A control circuit 22 is connected between the print voltage source V+ and print electrodes 18. Control circuit 22, which can be of conventional design, is implemented in accordance with the control circuit apparatus described in the commonly assigned and copending United States Patent Application Ser. No. 391,777 by Dailey et al. Alternatively, control circuit 22 can be implemented in accordance with the control circuit apparatus taught in the commonly assigned and copending United States Patent Application Ser. No. 323,843 by Pawletko et al. These circuits serve to form and then selectively forward voltage pulses of appropriate amplitude and/or width to the print electrodes 18 via print information cable 28. Control circuit 22 would, of course, be forming pulses pursuant to what type of material, text or graphics, is to be printed as that information is received via bus 24 from a source thereof.

In order to facilitate and expedite printing, a liquid applicator 26 is provided. The details of the applicator 26 and the liquid metering system in which it is utilized can be found in the commonly assigned and copending U.S. Pat. No. 4,335,967, which was also filed in the name of J. Pawletko. The applicator 26 is adapted to meter out very small quantities of liquid, preferably water, over the surface layer 12 of recording medium 10, just prior to its passing beneath print electrodes 18. The application of the fluid serves a dual purpose. It reduces frictional forces between the electrodes and the surface of the recording medium 10. The fluid also increases the conductivity of recording medium 10 in the print zone beneath each print electrode 18 and thereby facilitates and promotes the electrolytic printing process.

In a matrix printer of the type described herein, one of which the recording medium 10 is being moved at a constant rate, a typical write cycle time is 500 microseconds. This is the time that it would take to actuate each one of a plurality of print electrodes 18 that are contained in the printer's print head. The print head 30 is mounted transverse to the direction of recording medium travel, indicated by the arrows in FIG. 1, and may be as wide as as the recording medium, as in a line printer, or only of partial width, as in a printer where the print head is moved across the recording surface medium. The recording medium is itself typically moved at a speed of 6 inches per second. This gives enough time, in each print cycle, to control the duration of the period for which a print pulse is applied to a particular print electrode. Each time a print electrode is energized, it leaves a visible mark on the surface of recording medium 10. Variations in the pulses applied to the print electrodes 18, and they can be different for each energized electrode in a given print cycle, leave a mark of different intensity on the recording medium 10. This ability to vary printing parameters allows for grey scale control.

Figure 2:
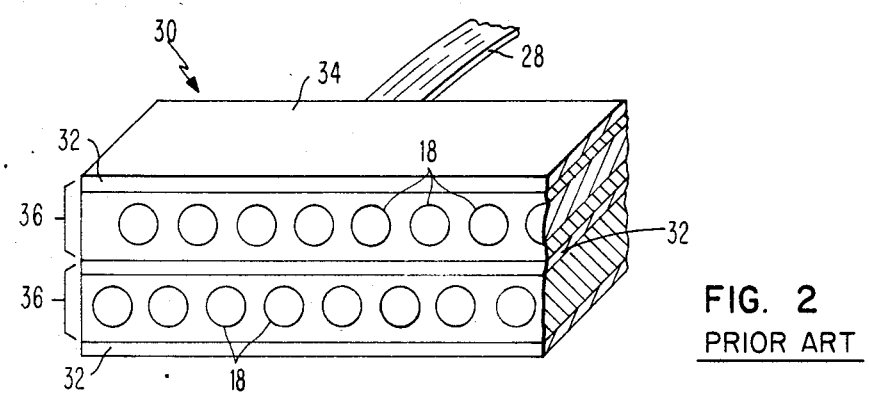
FIG. 2 schematically depicts, in greater detail, a print head usable in the FIG. 1 printing system, one having an electrode configuration implemented in accordance with the teachings of the prior art.

A prior art print head 30 is illustrated in FIG. 2. It consists of a plurality of electrodes 18 and 20, and ground planes 32, captured in a retaining block 34 composed of an insulating material. Retaining block 34 is composed of multiple layers 36 of glass, resin, epoxy or a mixture thereof, similar, if not identical, to that used in the manufacture of printed circuit boards. Each layer 36 is formed from the glass, resin, epoxy or insulating composite with a plurality of platinum wires, the electrodes 18, embedded therein. Each layer 36 is faced on at least one surface thereof with a sheet of conductive material, usually platinum, to form a ground plane 32. Where it is compatible with the electrolytic process and chemical interactions therein, nickel can be used in place of platinum for the ground plane material. It should be noted that the use of nickel or platinum for this purpose is unlike the printed circuit arts where copper is used as the interlaminar material. Copper, however, is not suitable for use in a print head having an electrolytic operating environment.

After being formed, the layers 36 are cured to their final state and then bonded together in appropriate number. Except for the inclusion of the platinum electrodes 18 and 20, the layers 36 can be manufactured in a similar manner to that used in the preparation of multiple layer printed circuit boards. Examples of this technique and the descriptive details thereof can be found in commonly assigned U.S. Pat. Nos. 4,030,190 and 4,201,616.

As shown in FIG. 2, each of the layers 36 includes a predetermined number of electrodes 18 and 20. The number of electrodes present in any one layer is a function of the desired resolution of the print copy. Electrodes 18 are coupled to a control circuit, to receive printing or character segment information therefrom, via cable 28. Electrodes 20 are connected to ground, also through cable 28. Typically, to obtain a high resolution print head of 240 PEL per inch (Printing ELements per unit length), 120 electrodes per layer are used in the two layer print head depicted in FIG. 2. Note that the electrodes, although staggered, do have an overlap 42 of about 2 to 5 mils, approximately 30 to 50 percent of electrode diameter. This overlap makes the final print copy have more of a filled appearance more like that of a fully formed character as opposed to the usual dot matrix formed character. It is important to note that the close electrode placement this amount of overlap and resolution requires is made possible by the significantly reduced stray current that would otherwise migrate from a printing print electrode to a non-printing print electrode during a given print cycle and thereby cause reversal of electrode function.

As previously noted, platinum electrodes were used because of their performance characteristics in an electrolytic operating environment. This relativeness "goodness" is mainly due to the formation of a passive layer on the outer surface of this metal that serves to shield it from most external electrolytic or electrochemical forces. Unfortunately, the FIG. 2 prior art print head and its associated control circuit allowed an electrode to function as a print element or anode in one print cycle and then as a ground electrode or cathode in the next or a subsequent print cycle. It was eventually learned that this reversal of electrode function was destroying the electrode's passivation layer and, with that, its ability to withstand the electrolytic printing operating environment without exhibiting undue, rapid wear.

Figure 3:
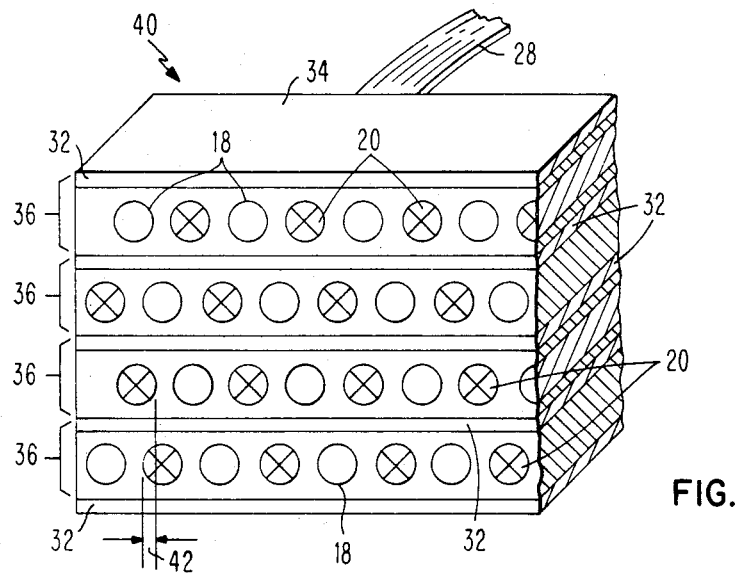
FIG. 3 schematically illustrates a simplified representation of an electrolytic print head having an electrode configuration that is implemented in accordance with the teachings of the present invention.

The print head 40, shown in FIG. 3, was one response to this problem. A predetermined number of electrodes 20 are permanently grounded. They cannot and do not change function. These electrodes are indicated, for greater ease of visual identification, with the letter "X". The remaining electrodes 18 are print electrodes and are employed for that function only. A print electrode 18 is either printing or is unused during any print cycle. It never serves as a ground or cathode and, therefore, never reverses its functional role. Where compatible with the chemistry of the particular eletrolytic process being employed, nickel cathodes can be substituted for the platinum ones originally used for economic purposes.

The preferred arrangement or configuration of print electrodes 18 and ground electrodes 20 is shown in FIG. 3. In this configuration, the ground electrodes 20 are intersticial, or placed between and about the print electrodes 18 of print head 40. Thus, in each row of electrodes that are formed, no two anodes are left adjacent each other. There is always a cathode horizontally interspersed between the anodes, with the horizontal direction being defined by the normal orientation of print head 40. This placement, in conjunction with the role of the ground planes 32, serves to isolate each print electrode 18 and keeps stray or leakage current from entering a pring electrode 18 and thereby harm its protective passivation layer. It should be noted that a ground plane 32 is positioned between each row of electrodes to block stray current leakage in a vertical direction. Since half of the electrodes in a standard layer 36 are now specifically inhibited from printing, it is necessary to use twice as many layers as was used in the prior art print head of FIG. 2 in order to obtain the same 240 PEL resolution. Consequently, twice as many print head layers 36 are used. The isolation effect of the intersticial ground electrodes 20 can be increased by using vertical ground planes instead of grounded electrode wires. This alternative is not as economically attractive as using a common electrode source, but it does promise additional reduction of stray interelectrode current flow. Print heads implemented in accordance with the present invention have been found to exhibit significantly improve operating life.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. Print head apparatus for an electrolytic printer wherein printing is effected by applying electrical pulses of appropriate duration and amplitude supplied by control means therefor to a recording medium to thereby cause any electrolytically involved leuco dye on the upper surface of the recording medium to be shifted into its visible range, said apparatus comprising:
   (a) a block of insulating material;
   (b) a first plurality of electrodes, secured in said insulating block at a predetermined distance from each other, permanently connected to said control means for actuation thereby only as anodes;
   (c) a second plurality of electrodes, secured in said insulating block at a predetermined distance from each other and from said first plurality of electrodes and positioned between adjacent ones of said first plurality of electrodes so that no two of said first plurality of electrodes are horizontally adjacent with respect to the normal orientation of said insulating block, said second plurality of electrodes being permanently connected to an electrical drain to serve only as cathodes; and
   (d) at least one plane of conductive material, one for each pair of interspersed rows of said first and second electrodes used in said print head, said plane being formed in said insulating block between said rows of electrodes, said plane being connected to said electrical drain to also serve as a cathode.

2. The apparatus according to claim 1 wherein said electrodes are placed in rows, said rows comprising alternating ones of said first and second plurality of electrodes, the centers of said electrodes being spaced so that there is a printing offset of from 30 to 50 percent of the diameter of said anode electrodes.

3. The apparatus according to claim 2 which includes 4 rows of alternating first and second electrodes in each row and a plane of conductive material positioned between each row.

4. The apparatus according to claim 1 which includes 4 rows of electrodes of alternating first and second electrodes in each row and a plane of conductive material positioned between said rows.

* * * * *